(12) United States Patent
Wu et al.

(10) Patent No.: US 9,756,672 B2
(45) Date of Patent: Sep. 5, 2017

(54) METHOD AND EQUIPMENT FOR ESTABLISHING DEVICE TO DEVICE CONNECTION THROUGH DEDICATED DISCOVERY SIGNAL

(71) Applicant: ZTE CORPORATION, Shenzhen, Guangdong (CN)

(72) Inventors: Shuanshuan Wu, Shenzhen (CN); Feng Liang, Shenzhen (CN); Haitao Ren, Shenzhen (CN); Yifei Yuan, Shenzhen (CN); Ming Yuan, Shenzhen (CN); Jin Yang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/758,738

(22) PCT Filed: Dec. 16, 2013

(86) PCT No.: PCT/CN2013/089570
§ 371 (c)(1),
(2) Date: Jun. 30, 2015

(87) PCT Pub. No.: WO2014/101681
PCT Pub. Date: Jul. 3, 2014

(65) Prior Publication Data
US 2015/0341974 A1    Nov. 26, 2015

(30) Foreign Application Priority Data

Dec. 31, 2012    (CN) .......................... 2012 1 0590583

(51) Int. Cl.
*H04W 76/02*    (2009.01)
*H04W 8/00*    (2009.01)
(Continued)

(52) U.S. Cl.
CPC ......... *H04W 76/023* (2013.01); *H04W 8/005* (2013.01); *H04W 56/0015* (2013.01);
(Continued)

(58) Field of Classification Search
CPC ........... H04W 56/0015; H04W 72/048; H04W 74/0833; H04W 76/02; H04W 76/023; H04W 88/04; H04W 8/005
See application file for complete search history.

(56) References Cited

U.S. PATENT DOCUMENTS

| 7,363,003 B2 | 4/2008 | Takatani et al. |
| 2003/0033452 A1* | 2/2003 | Himmel ................ H04W 74/06 710/9 |

(Continued)

FOREIGN PATENT DOCUMENTS

| CN | 1582590 A | 2/2005 |
| CN | 101389116 A | 3/2009 |

(Continued)

OTHER PUBLICATIONS

Hung-Yu Wei et al., "Two-Hop-Relay Architecture for Next-Generation WWAN/WLAN Integration", 4G Mobile Communications: Toward Open Wireless Architecture, XP-001196396, IEEE Wireless Communications, Apr. 2004, pp. 24-30.

(Continued)

*Primary Examiner* — Devan Sandiford
(74) *Attorney, Agent, or Firm* — Brooks Kushman P.C.

(57) ABSTRACT

The present document relates to a wireless communication method, a user equipment, a network device, and a system. The method includes: a first user equipment sending a dedicated discovery signal; the first user equipment receiving a response message, wherein the response message is sent by a second user equipment which has detected the dedicated discovery signal; the first user equipment estab- (Continued)

lishing a device-to-device connection with the second user equipment; and the first user equipment communicating with a network side through the device-to-device connection and a communication link between the second user equipment and the network side.

20 Claims, 6 Drawing Sheets

(51) Int. Cl.
*H04W 56/00* (2009.01)
*H04W 72/04* (2009.01)
*H04W 74/08* (2009.01)
*H04W 88/04* (2009.01)

(52) U.S. Cl.
CPC ..... *H04W 72/048* (2013.01); *H04W 74/0833* (2013.01); *H04W 76/02* (2013.01); *H04W 88/04* (2013.01)

(56) References Cited

U.S. PATENT DOCUMENTS

| | | | | |
|---|---|---|---|---|
| 2005/0227616 A1* | 10/2005 | Takatani | ............... | H04B 7/2606 455/11.1 |
| 2006/0239333 A1* | 10/2006 | Albert | ............... | H04W 72/0406 375/130 |
| 2008/0112334 A1* | 5/2008 | Laroia | ................ | H04W 40/244 370/254 |
| 2009/0016248 A1* | 1/2009 | Li | ......................... | H04L 5/0053 370/310.1 |
| 2009/0016249 A1* | 1/2009 | Li | ......................... | H04J 3/0638 370/310.1 |
| 2009/0016250 A1* | 1/2009 | Li | ......................... | H04W 48/08 370/310.1 |
| 2009/0016353 A1* | 1/2009 | Li | ......................... | H04W 8/005 370/395.3 |
| 2009/0017797 A1* | 1/2009 | Li | ......................... | H04L 67/104 455/414.1 |
| 2009/0017844 A1* | 1/2009 | Li | ......................... | H04W 68/00 455/458 |
| 2009/0323648 A1* | 12/2009 | Park | ...................... | H04W 8/005 370/338 |
| 2009/0325601 A1* | 12/2009 | Park | ...................... | H04W 8/005 455/456.2 |
| 2009/0327395 A1* | 12/2009 | Park | ...................... | H04W 8/005 709/202 |
| 2010/0165882 A1* | 7/2010 | Palanki | ................ | H04W 8/005 370/254 |
| 2010/0167743 A1 | 7/2010 | Palanki et al. | | |
| 2010/0177699 A1* | 7/2010 | Klefter | ................ | H04W 60/00 370/328 |
| 2010/0271959 A1* | 10/2010 | Qi | ............................ | H04L 41/12 370/248 |
| 2011/0103264 A1* | 5/2011 | Wentink | ............... | H04W 8/005 370/255 |
| 2011/0268101 A1* | 11/2011 | Wang | ..................... | H04L 5/0053 370/344 |
| 2012/0269250 A1* | 10/2012 | Li | ......................... | H04L 5/0053 375/227 |
| 2013/0010618 A1* | 1/2013 | Wang | ..................... | H04W 8/005 370/252 |
| 2013/0010661 A1* | 1/2013 | Esteves | ................. | H04B 1/713 370/310 |
| 2013/0016629 A1* | 1/2013 | Mallik | .................. | H04W 8/005 370/255 |
| 2013/0064138 A1* | 3/2013 | Hakola | ................... | H04L 67/16 370/255 |
| 2013/0157656 A1* | 6/2013 | Gao | ..................... | H04W 76/023 455/434 |
| 2013/0157670 A1* | 6/2013 | Koskela | .............. | H04W 74/006 455/450 |
| 2014/0004796 A1* | 1/2014 | Cakulev | .............. | H04W 76/023 455/41.2 |
| 2014/0056220 A1* | 2/2014 | Poitau | .................. | H04W 40/246 370/328 |
| 2014/0112194 A1* | 4/2014 | Novlan | .................. | H04W 8/005 370/254 |
| 2015/0085697 A1* | 3/2015 | Gulati | ................... | H04W 48/14 370/254 |
| 2015/0163707 A1* | 6/2015 | Hwang | ............. | H04W 36/0061 370/331 |

FOREIGN PATENT DOCUMENTS

| | | |
|---|---|---|
| CN | 102469410 A | 5/2012 |
| EP | 1793629 A1 | 6/2007 |
| WO | 2011036507 A1 | 3/2011 |

OTHER PUBLICATIONS

Extended European Search Report Dated Nov. 11, 2015, Application No. 13866823.1-1857 / 2928257 PCT/CN2013089570, Applicant ZTE Corporation, 9 Pages.

PCT International Preliminary Report on Patentability and Written Opinion with PCT International Search Report Dated Mar. 27, 2014, Application No. PCT/CN2013/089570, 10 Pages.

* cited by examiner

METHOD AND EQUIPMENT FOR ESTABLISHING DEVICE TO DEVICE CONNECTION THROUGH DEDICATED DISCOVERY SIGNAL

CROSS-REFERENCE TO RELATED APPLICATION

This application is the U.S. national phase of PCT Appln. No. PCT/CN2013/089570 filed Dec. 16, 2013, which claims priority to Chinese Application No. 201210590583.9 filed Dec. 31, 2012, the disclosures of which are incorporated in their entirety by reference herein.

TECHNICAL FIELD

The present document relates to the field of wireless communication, and particularly, to a communication method, a user equipment, a network device, and a system applied to a cellular wireless communication system.

BACKGROUND

Since the cellular communication implements the reuse of limited spectrum resources, so that the wireless communication technology achieves a booming development. In a cellular communication system, when there is service transmission between two User Equipments (UE), for example, service data from a user equipment 1 (UE1) to a user equipment 2 (UE2) will be firstly transmitted to a Base Station (or a Node B, or an evolved Node B) of a cell in which the UE1 is located via an air interface, and the base station transmits the user data to a base station of a cell in which the UE2 is located via a core network, and the base station then transmits the above service data to the UE2 via the air interface. The similar processing flow is adopted in service data transmission from the UE2 to the UE1.

With regard to a Radio Access Network (RAN) part of the wireless communication, the signal transmission quality is mainly dependent on the wireless channel condition. In practical network deployment, generally it is required to comprehensively consider the wireless environments of the area in which the network is located, so as to ensure the network coverage. However, many factors may usually affect the network coverage. For example, all the network facility damage, etc. caused by reasons such as dense urban areas full of high-rise buildings, indoor environments and disasters may affect the network coverage quality, and even generate a wireless network coverage blind area. In these cases, the user experience may be affected seriously. And sometimes, it is not a good choice to improve the coverage quality by deploying more network nodes, for example, a serious interference problem may be brought, or network capital expenditures of the operators will be increased. However, when network infrastructure damage is caused due to reasons such as natural disasters and so on, it is usually required to restore the communication rapidly, but the restoration or redeployment of the network facilities may always fail to meet the requirements in time and speed.

SUMMARY

The embodiments of the present document provide a wireless communication method, a user equipment, a network device, and a system, to solve the technical problem that the existing network facilities cannot meet the communication requirements.

The embodiment of the present document provides a wireless communication method, which comprises:

a first user equipment sending a dedicated discovery signal;

the first user equipment receiving a response message, wherein the response message is sent by a second user equipment that has detected the dedicated discovery signal;

the first user equipment establishing a device-to-device connection with the second user equipment; and the first user equipment communicating with a network side through the device-to-device connection and a communication link between the second user equipment and the network side.

The embodiment of the present document further provides a user equipment for implementing the above method, which comprises:

a sending unit, configured to send a dedicated discovery signal;

a receiving unit, configured to receive a response message, wherein the response message is sent by a second user equipment that has detected the dedicated discovery signal;

a connection establishment unit, configured to: after receiving the response message, establish a device-to-device connection with the second user equipment; and a communication unit, configured to communicate with a network side through the device-to-device connection and a cellular communication link between the second user equipment and the network side.

The embodiment of the present document further provides a wireless communication method, which comprises:

a second user equipment detecting a dedicated discovery signal sent by a first user equipment;

the second user equipment sending a response message of the dedicated discovery signal to the first user equipment;

the second user equipment establishing a device-to-device connection with the first user equipment; and the second user equipment relaying communication data between the first user equipment and a network side through the device-to-device connection and a cellular communication link between the second user equipment and the network side.

The embodiment of the present document further provides a user equipment, which comprises:

a receiving unit, configured to detect a dedicated discovery signal sent by a first user equipment;

a sending unit, configured to send a response message of the dedicated discovery signal to the first user equipment;

a connection establishment unit, configured to establish a device-to-device connection with the first user equipment; and a data relay unit, configured to: relay communication data between the first user equipment and a network side through the device-to-device connection and a cellular communication link between the second user equipment and the network side.

The embodiment of the present document further provides a wireless communication method, which comprises:

a network side receiving an authorization request sent by a second user equipment; and the network side sending an authorization response to the second user equipment based on a received authorization request, wherein the authorization response is used for authorizing the second user equipment to establish a device-to-device connection with a first user equipment, and the network side communicates with the first user equipment through a cellular communication link between the second user equipment and the network side and the device-to-device connection.

The embodiment of the present document further provides a network device, which comprises:

receiving unit, configured to receive an authorization request sent by a second user equipment;

an authorization unit, configured to generate an authorization response based on a received authorization request; and a sending unit, configured to send the authorization response to the second user equipment, wherein the authorization response is used for authorizing the second user equipment to establish a device-to-device connection with a first user equipment, and the network device communicates with the first user equipment through a cellular communication link between the second user equipment and the network device and the device-to-device connection.

The embodiment of the present document further provides a wireless communication system, which comprises: a first user equipment, a second user equipment and a network device as mentioned above.

Compared with the related art, in the wireless communication method, user equipment, network device, and system of the embodiments of the present document utilize the second user equipment establishing the connection with the network side as the relay of the first user equipment to solve the wireless communication problem when the first user equipment is located in a worse network coverage or in a network coverage blind area, thereby significantly improving the user experience of the wireless communication, and not leading to the cost increase of the network deployment of the telecom operators.

PREFERRED EMBODIMENTS OF THE DOCUMENT

The technology mentioned in the present document is applicable to a cellular wireless communication system or network. The common cellular wireless communication systems can be based on the Code Division Multiple Access (CDMA) technology, Frequency Division Multiple Access (FDMA) technology, Orthogonal FDMA (OFDMA) technology and Single-carrier FDMA (SC-FDMA) technology and so on. For example, a downlink (or called a forward link) of the 3rd Generation Partnership Project (3GPP) Long Term Evolution (LTE)/LTE-Advanced (LTE-A) cellular communication system is based on the OFDMA technology, and an uplink (or called a reverse link) is based on the SC-FDMA technology. It is possible to support a mixed multiple access technology in one link in the future.

Figure 1:
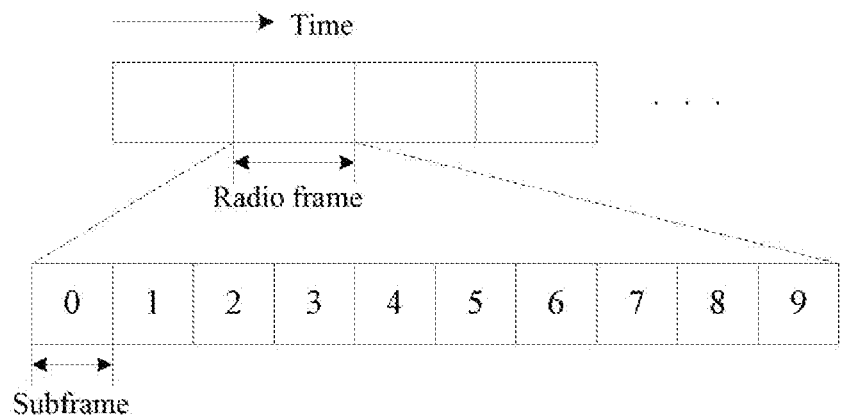
FIG. 1 is a schematic diagram of a structure of a radio frame in the LTE/LTE-A system.

In an OFDMA/SC-FDMA system, wireless communication resources are in a time-frequency two-dimensional form. For example, with regard to the LTE/LTE-A system, communication resources of the uplink and downlink are all divided in a unit of radio frame in a time direction, the length of each radio frame is 10 ms, 10 sub-frames with each length of 1 ms are contained in one radio frame, and each sub-frame includes two slots with each length of 0.5 ms, as shown in FIG. 1.

Figure 2:
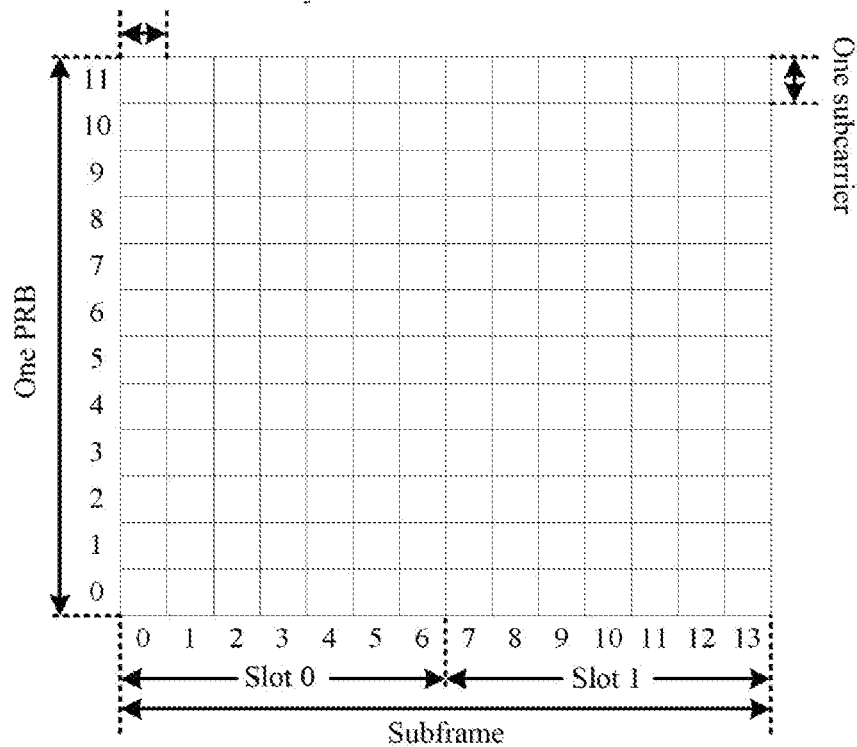
FIG. 2 is a schematic diagram of a structure of physical resources in the LTE/LTE-A system.

In a frequency direction, resources are divided in a unit of subcarrier, specifically, in communication, the minimum unit of frequency domain resource allocation is a Resource Block (RB), corresponding to one Physical RB (PRB) of physical resources. One PRB contains 12 sub-carriers in a frequency domain, corresponding to one slot in a time domain. According to the difference of configurations of Cyclic Prefix (CP), each slot can include 6 or 7 OFDM/SC-FDM symbols. Resources corresponding to one subcarrier on each OFDM/SC-FDM symbol are called a Resource Element (RE), as shown in FIG. 2.

In the LTE/LTE-A cellular communication, a UE discovers an LTE cell by detecting a Synchronization Signal (SS). Synchronization signals include a Primary SS (PSS) and a Secondary SS (SSS). The UE obtains synchronization with the downlink frequency and time synchronous of a base station by detecting the synchronization signal. Moreover, since the synchronization signal carries a physical cell identity, detecting the synchronization signal also means that the UE discovers the LTE/LTE-A cell.

In an uplink, when the UE has uplink data to be transmitted, it is required to initiate Random Access (RA) to perform uplink synchronization, and enter a Radio Resource Control (RRC) Connected state from an RRC Idle state. The UE is required to send a random access preamble during the random access, and the network side achieves the identification of the UE and the uplink synchronization by detecting the random access preamble in specific time-frequency resources.

Figure 3:
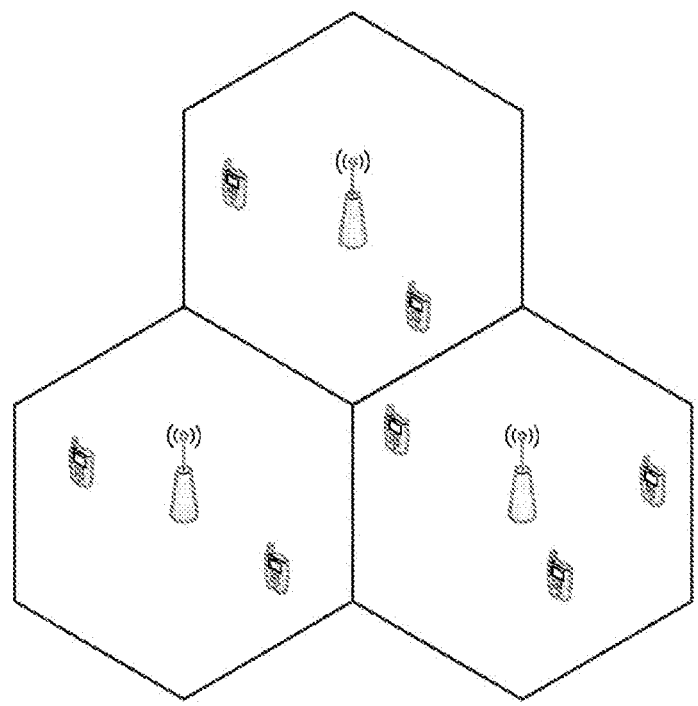
FIG. 3 is a schematic diagram of network deployment of the cellular wireless communication system.

FIG. 3 shows a schematic diagram of network deployment of the cellular wireless communication system. What is shown in the figure can be a 3GPP LTE/LTE-A system, or it can be based on other cellular wireless communication technologies. In an access network of the cellular wireless communication system, network devices generally include a certain number of base stations (or called Node B, or evolved Node B (eNB), or enhanced Node B (eNB)) and other network entities or network elements. Or, in general, they also can be collectively called as a network side, such as an Evolved Universal Terrestrial Radio Access Network (E-UTRAN) of the LTE/LTE-A system. The base stations mentioned here also include a Low Power Node (LPN) in the network, such as a picocell or a home Node B (pico, Relay, femto and Home eNB (HeNB), etc.). For a simple description, FIG. 3 only shows 3 base stations. A base station provides a certain wireless signal coverage area, a terminal (or called a User Equipment (UE) or a device) within the coverage area can perform wireless communication with the base station. The wireless signal coverage area of one base station may be divided into one or multiple cells or sectors such as three cells based on certain criterions, and wireless communication of each cell can be processed by an independent subsystem, such as an independent radio frequency unit.

The wireless broadcasting environments are always complicated and changeable. For example, larger barriers such as buildings may cause that shadow fading is generated in wireless signals and result in worse coverage; or, penetration loss will cause that indoor signal coverage is worsened. In a typical urban scenario full of high-rise buildings, the above negative effects may be more apparent, and it is unrealistic to improve the coverage quality by continually increasing the number of base stations, which will not only cause that the inter-cell interference coordination is more difficult due to the increasing number of cells, but also lead to increased capital expenditures (CAPEX) of network deployment of the telecommunication operators. On the other hand, when part of facilities in the network are damaged (due to reasons such as disaster, etc.), the requirement for emergency communication is urgent, but the redeployment of network facilities always needs time.

Based on the above consideration, the embodiment of the present document provides a method for improving the wireless communication quality rapidly and effectively, which can not only apparently improve the user experience, but also won't significantly increase the CAPEX of the operators, and also can be applicable to the emergency communication in a case that part of the network infrastructures are damaged in the meantime.

The method includes: when a user equipment judges that a dedicated cellular communication condition is satisfied, the user equipment sending a dedicated discovery signal and waiting to detect a response signal from other user equipments; if the response signal is detected, the user equipment establishing a device-to-device connection with the other user equipments, and establishing a communication link between the user equipment and a cellular network via the other user equipments, that is, communicating with the cellular network through the other user equipments. For convenience, hereinafter we call the user equipment as a source user equipment or a first user equipment, and the other user equipments as a relay user equipment or a second user equipment.

Figure 4:
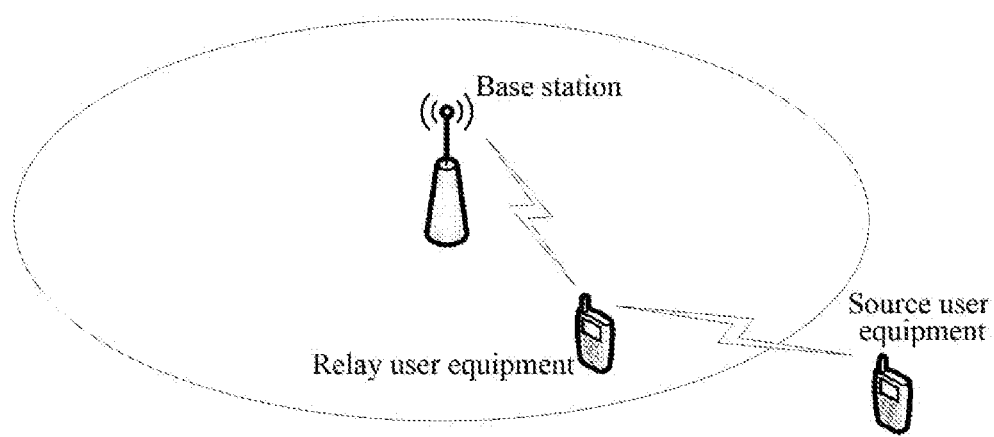
FIG. 4 is a schematic diagram of a communication link of the source user equipment establishing with the eNB via the relay user equipment according to the embodiment of the present document.

The dedicated cellular communication condition refers to that, the user equipment has a cellular communication requirement, but a signal of the cellular network is not detected (e.g., it may be located in a coverage blind area); or it is located in a coverage area of the cellular network, but the signal quality is worse, for example, it may be that the detected signal of the cellular network is lower than a preset threshold value, or it is unable to establish a connection with the network side. The cellular communication requirement here refers to a requirement of the user equipment for communicating with network side devices (such as a base station) in general. With regard to the LTE/LTE-A system, the dedicated cellular communication condition can be that, the UE has a requirement for communicating with the eNB, but a signal of the eNB such as a synchronization signal and/or a broadcasting channel is not detected; or it is unable to normally complete a random access process or connection establishment process, or normal communication cannot be guaranteed. FIG. 4 shows a schematic diagram of the source user equipment establishing a communication link with the eNB via the relay user equipment.

For example, with regard to the source user equipment, when it is judged that the dedicated cellular communication condition is satisfied, the dedicated discovery signal can be sent in the dedicated resources.

The dedicated resources refer to resources used for transmission of the dedicated discovery signal. It can be frequency domain dedicated resources, for example, it is to appoint that locations of part of frequency-domain subcarriers or resource blocks in the system bandwidth can be used for sending the dedicated discovery signal. For example, with regard to a TDD system, it can be a specific number of subcarriers or resource blocks in the middle of the system bandwidth; and with regard to an FDD system, it can be a specific number of subcarriers or resource blocks in the middle of the downlink frequency band, or a specific number of subcarriers or resource blocks in the middle of the uplink frequency band. It should be noted that limiting the dedicated resources to be at the middle of the frequency band is only for giving an example, which is not limited to the middle, and can be an arbitrary appointed location within the frequency band. Or, it is to appoint that the dedicated resources are locations of the 10 subcarriers that are not used by the synchronization signal in the 6 resource blocks in which the synchronization signal is located, which can avoid that the dedicated discovery signal generates interference to the synchronization signal.

The dedicated resources also can be frequency-time domain dedicated resources. The limitation of the frequency domain dedicated resources is similar to the above description; the time domain can be a specific time location, such as in a radio frame with a specific number, or in a subframe with a specific number, or a combination of the two namely in a specific subframe of a radio frame with a specific number. The time domain is limited in view of that the source user equipment may keep synchronous with the cellular network by certain technological means, such as satellite signals; or even though it is unable to communicate with the eNB, it can still be synchronous with the eNB, such synchronization can be conventional synchronization, and it also may be coarse synchronization, for example, it may be unable to synchronize to be within the cyclic prefix CP, and it can only obtain an approximate subframe boundary, or an approximate radio frame boundary, or synchronization or dedicated resource configuration obtained by the source user equipment from the network side before the dedicated cellular communication condition is satisfied, for example, when it is located within the coverage. The limitation of the time domain can be in an appointed way, for example, it is to appoint that radio frames with certain numbers, or subframes with certain numbers, or certain subframes in the radio frames with certain numbers can be used for sending the dedicated discovery signal; or the eNB broadcasts the configuration of time domain resources, for example, the number configuration of the subframes and/or radio frames is broadcasted, etc. Similarly, besides the appointed way, the frequency domain resources also can be allocated by means of the network side, such as an eNB allocation way, for example, the eNB sends the frequency domain resource configuration of the dedicated resources by means That is, the dedicated resources can be determined in the appointed way or the way of network side allocation. With regard to the way of network side allocation, it can be an allocation signaling detected by the UE in real time or the dedicated resource configuration obtained from the network side and saved by the UE before the entered network coverage is worse or there is no signal coverage area.

The dedicated discovery signal can be a Reference Signal (RS, or called as a pilot) or a preamble, and a known sequence is used. Known refers to that a set of reference signals or preambles is defined in the system, the source user equipment selects one in the set to send according to a certain rule or randomly, and only one sequence also can be included in the set. Or, the system defines a generation formula of the reference signal or preamble, the source user equipment generates the dedicated discovery signal according to the formula and sends the dedicated discovery signal. The reference signal or preamble here also can reuse the related designs in the LTE/LTE-A cellular system, for example, the reference signal can be a downlink Cell-specific RS (CRS) or Channel State Information RS (CSI-RS) or Positioning RS (PRS) or UE-specific RS (URS), or a truncating sequence of the above certain reference signals, or an uplink Demodulation RS (DMRS) or Sounding RS (SRS); for example, the preamble can be a random access preamble, etc.

The dedicated discovery signal can also be just one power. That is, it is to indicate whether the source user equipment or the dedicated communication requirement of the source user equipment exists or not only by whether there is a user equipment performing sending in the dedicated resources. The dedicated discovery signal can occupy one or a plurality of resource elements REs, or one or multiple resource blocks RBs. It can also be further appointing that a resource element of the dedicated discovery signal has higher power, for example, it is at least 3 dB or 10 dB higher than power of a data resource unit. The 3 dB and 10 dB here are only for giving an example, which is used for describing that the power of the dedicated discovery signal is higher than the data power, and does not constitute a limitation on power relative values of the two.

The dedicated discovery signal can also be a Synchronization Signal (SS). For example, a primary synchronization signal PSS and/or a secondary synchronization signal SSS of the LTE/LTE-A cellular communication system is reused; or a new synchronization signal is designed.

The dedicated discovery signal can also be a data block including the reference signal or synchronization signal, and the data block uses an appointed modulation and coding scheme. The data block can include one or more than one in the following information: an identity of the source user equipment, a requested service type, and capability information of the user equipment, etc.

The object of the dedicated discovery signal is to indicate the existence of the source user equipment or the dedicated communication requirement of the source user equipment.

With regard to the relay user equipment, when a relay function of the relay user equipment is activated or enabled, the dedicated discovery signal is detected in the dedicated resources. The definition of the dedicated resources is similar to the previous statements. The relay function refers to that the user equipment has a function of providing relay services for other source user equipments, that is, a communication connection or communication link between the source user equipment and the cellular network can be established via the relay user equipment. The relay function can be activated in an appointed way, for example, when a cellular communication function of the user equipment is enabled, it is to appoint that the relay function is enabled; or the user subscribes with the operators, and the relay function is promptly enabled when the subscription comes into force. Or, the relay function can be enabled by the user voluntarily, for example, the user enables the relay function via a relay function switch of a user interface UI of the user equipment. Or, the relay function can be enabled by the network side device sending a control signaling, for example, when determining that there is a relay requirement, the network side enables the relay function of the relay user equipment.

If the dedicated discovery signal is detected, the relay user equipment sends a response message to the source user equipment. The detection can be that received power of the dedicated discovery signal conforms to a received power threshold defined by the system or user equipment; or a peak value of the sequence correlation operation conforms to a peak value threshold defined by the system or user equipment; or decoding is correct, for example, Cyclic Redundancy Check (CRC) is correct.

The embodiments of the present document will be described in detail in combination with the accompanying drawings and specific embodiments below, so that the skilled in the art can better understand the embodiments of the present document and implement the embodiments of the present document, but the illustrated embodiments are not a limitation to the present document. It should be noted that the embodiments in the present document and the characteristics in the embodiments can be combined with each other in the condition of no conflict.

Embodiment 1

Figure 5:
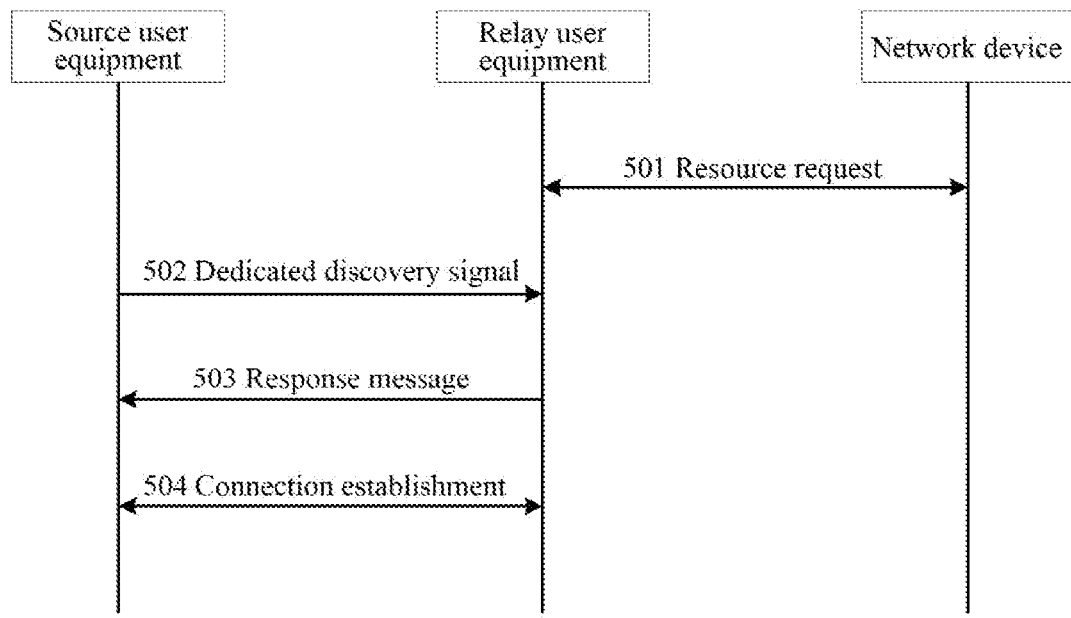
FIG. 5 to FIG. 10 are respectively schematic diagrams of the wireless communication methods according to the embodiments 1-6 of the present document.

FIG. 5 shows a schematic diagram of a wireless communication method according to the embodiment 1 of the present document, and the embodiment 1 includes the following steps.

In step 501, a relay user equipment firstly requests a network device for resources, the requested resources are used for transmission of the related signals/signalings or data during the mutual discovery with a source user equipment.

The process of requesting resources may simultaneously include a Registration process and/or Authentication process and/or Attach process of the relay user equipment to the network, and a Radio Resource Control (RRC) connection establishment process of the wireless side. Through the resource request, the relay user equipment obtains an authorization for performing mutual discovery with other source user equipments from the network side. For example, after a relay function of the relay user equipment is enabled, the relay user equipment requests the network for resources. The resources requested here can be air interface resources of the wireless link, such as time-frequency resources, or a Radio Bearer, such as a Signalling Radio Bearer (SRB) and/or a Data Radio Bearer (DRB); or the air interface resources and the radio bearer are included simultaneously.

In step 502, after obtaining the authorization of the network, the relay user equipment detects a dedicated discovery signal sent by the source user equipment.

The object of sending the dedicated discovery signal is to indicate the existence of the source user equipment or the dedicated communication requirement of the source user equipment. The sending and detection of the dedicated discovery signal is as mentioned above. It should be noted that, after obtaining the authorization of the network, and during monitoring the dedicated discovery signal, the relay user equipment can be in an RRC Connected state (or called an Active state) or an RRC Idle state.

After the relay user equipment detects the dedicated discovery signal, it indicates that a source user equipment or a source user equipment with a dedicated cellular communication requirement exists in the area adjacent to the relay user equipment.

In step 503, the relay user equipment sends a response message to the source user equipment according to the detected dedicated discovery signal, and the source user equipment receives the response message in response message resources after sending the dedicated discovery signal.

The wireless resources for transmitting the response message can be reserved resources, for example, specific time-frequency resources are reserved in the system to be used for transmission of the response message. The resources for transmitting the response message also can be resources allocated by the network side, for example, in the above process of requesting resources, the network side simultaneously allocates or authorizes time-frequency resources used for transmission of the response message to the relay user equipment.

The response message can include a synchronization signal or a reference signal. The synchronization signal is used for synchronization between the source user equipment and the relay user equipment, and it can be a synchronization signal sequence, such as a primary synchronization signal PSS sequence and/or secondary synchronization signal SSS sequence of the LTE/LTE-A system; or a dedicated Const Amplitude Zero Auto Correlation (CAZAC) sequence, such as a Zadoff-Chu (ZC) sequence, or a reference signal or preamble sequence with a synchronization function.

The response message can include a data part. For example, the data part may include a device discovery response message, which indicates that the source user equipment has been discovered. For example, the device discovery response message includes an identity of the dedicated discovery signal sent by the source user equipment, the identity can be an index of the discovery signal, or an index of the discovery signal resource, or a combination of the two indexes, or an identity of the source user equipment carried in the dedicated discovery signal.

The data part of the response message can include information used for estimating whether the user equipment is allowed to access the cell. For example, the response message can include a System Information Block Type1 (SIB1) of the LTE/LTE-A cellular system or part of parameters in the SIB1. That is, the relay user equipment forwards the SIB1 or part of information in the SIB1 received from the cellular network to the source user equipment through the response message. The part of information in the SIB1 includes but is not limited to plmn-IdentityList, trackingAreaCode, cellIdentity and freqBandIndicator and so on.

The data part of the response message can include common wireless resource configuration information. For example, the response message can include a System Information Block Type2 (SIB2) of the LTE/LTE-A cellular system or part of parameters in the SIB2. That is, the relay user equipment forwards the SIB2 or part of information in the SIB2 received from the cellular network to the source user equipment through the response message.

The response message also can include synchronization related information, such as radio frame and/or subframe number information of the cellular network.

There can be an association relationship between the response message and the discovery signal. For example, there is an association relationship between the synchronization signal sequence or reference signal sequence of the response message and the dedicated discovery signal, and the synchronization signal sequence of the response message is calculated and determined through a time-frequency location index and/or sequence index of the dedicated discovery signal (it can be a sequence index and/or a sequence generation formula and/or a sequence cyclic shift and so on, but not limited to this); or, the data part of the response message includes an identity of the dedicated discovery signal; or, the response message is identified by the identity of the dedicated discovery signal, for example, a scrambling sequence of the response message or a Cyclic Redundancy Check (CRC) part of the response message is identified through the dedicated discovery signal.

Sending timing of the response message can be cellular downlink receiving timing of the relay user equipment or cellular uplink sending timing of the relay user equipment; or when detecting the timing of the dedicated discovery signal, the relay user equipment takes receiving timing of the dedicated discovery signal as sending timing of the response message.

With regard to the source user equipment, the response message resources can be determined in an appointed way, for example, after sending the dedicated discovery signal, the source user equipment receives the response message within a time window with a fixed interval to the dedicated discovery signal. The frequency domain location of the response message can be determined by configuration or in the appointed way.

For example, when it is to receive the response message, receiving timing for receiving the response message and a time window can be firstly determined by detecting the synchronization signal or reference signal in the response message, and the response message is received in the time window; or according to the timing for sending the dedicated discovery signal, a receiving window for receiving the response message is determined according to an appointed interval, and the response message is received in the receiving window.

In step 504, after the source user equipment receives the response message, a device-to-device connection is established between the source user equipment and the relay user equipment.

Specifically, it can estimate whether it is allowed to access the cell through related parameters of whether to be allowed to access the cell in the response message. If it is not allowed, the source user equipment discontinues the connection establishment process; and if it is allowed, sends a connection request to the relay user equipment, and establishes a Device-to-Device (D2D) connection with the relay user equipment. Or, if the response message is detected, it means that the source user equipment is allowed to access the cell, the source user equipment sends the connection request to the relay user equipment, and establishes the device-to-device connection with the relay user equipment. The connection request can include a UE Identity of the source user equipment and/or a Cause of the connection establishment. Or, the information included in the connection request can be identical with the RRC connection request message in the LTE system.

The wireless resources used in establishing the device-to-device connection can be allocated by the relay user equipment, for example, the data part of the response message can include a resource allocation parameter. The resource allocation can be the relay user equipment performing secondary allocation on the wireless resources which are requested to the network device, or the requested resources include an allocation condition of the wireless resources used in establishing the connection, and the relay user equipment forwards the related resource allocation condition to the source user equipment.

The established device-to-device connection described here can be a physical layer connection, for example, through the above signal transceiving, the source user equipment and the relay user equipment can be mutually aware of each other's presence; or it can be an RRC connection; or it can be an established radio bearer.

Therefore, the source user equipment can rely on a device-to-device connection established between the source user equipment and the relay user equipment and a cellular connection between the relay user equipment and the network device to communicate with the network side, that is, a dedicated cellular connection between the source user equipment and the network device is established through the device-to-device connection and the cellular connection between the relay user equipment and the network device. The dedicated cellular connection can be an RRC connection or a radio bearer (a signaling radio bearer and/or a data radio bearer); or the dedicated cellular connection is only implementing a registration of the source user equipment in the network side.

In the above scheme, the connection is established by directly performing D2D discovery between the source user equipment and the relay user equipment. Alternatively, the source user equipment also can establish the connection between the source user equipment and the relay user equipment through random access.

Specifically, besides the information for estimating whether the user equipment is allowed to access the cell and the common wireless resource configuration information, the response message also can include random access configuration information. The random access configuration information can include parameter configurations required for the user performing random access, such as a random access parameter configuration of the LTE/LTE-A system, or a random access parameter configuration similar to the random access parameter configuration of the LTE/LTE-A system. For example, a random access configuration parameter of the cellular network is directly forwarded to the source user equipment, or part of resources in the random access resources allocated by the cellular system is allocated to be used for the random access of the source user equipment, or the network side allocates random access resources different from the random access resources allocated by the cellular system for the device-to-device link. The relay user equipment can send the random access configuration to the source user equipment through the response message. The sending timing of the response message can be the same as the previous statements.

After sending the dedicated discovery signal, the source user equipment receives the response message from the relay user equipment. The process of receiving the response message can be the same as the above scheme. The source user equipment can obtain a parameter configuration related to the random access through the random access configuration information carried in the response message, and initiates the random access to the relay user equipment based on the parameter configuration.

After sending the response message, the relay user equipment waits to detect a random access request from the source user equipment, for example, it monitors a random access preamble sent by the source user equipment. Through the random access process, the source user equipment initiates to establish a device-to-device connection with the relay user equipment. The connection can be an RRC connection or a radio bearer.

The wireless resources used in establishing the device-to-device connection namely in the random access process can be allocated by the relay user equipment, for example, the response message also can include a resource allocation parameter. The resource allocation can be the relay user equipment performing secondary allocation on the resources which are requested to the network device, or the requested resources include an allocation condition of the resources used in establishing the connection, and the relay user equipment forwards the related resource allocation condition to the source user equipment.

Therefore, the source user equipment can rely on a device-to-device connection established between the source user equipment and the relay user equipment and a cellular connection between the relay user equipment and the network device to achieve the communication between the source user equipment and the network side.

In the response message sent by the relay user equipment to the source user equipment after detecting the dedicated discovery signal, a paging message also can be included. The paging message includes a resource index of the dedicated discovery signal, or a sequence index, or a user equipment identity carried in the dedicated discovery signal, and a source user equipment paging and sending the dedicated discovery signal. As mentioned before, the synchronization related information also can be carried in the response message, for example, a synchronization signal/reference signal and/or radio frame and subframe number information can be included.

After sending the dedicated discovery signal, the source user equipment monitors the paging message. For example, the source user equipment obtains a receiving window for the response message and/or paging message by detecting the synchronization signal in the response message, and further detects the paging message included in the response message in the receiving window. After the paging message is detected, a paging response is sent to the relay user equipment, the paging response can include a connection establishment request, and a device-to-device connection with the relay user equipment is established based on the connection establishment request; or the random access is initiated to the relay user equipment after the paging message is detected, the establishment of the device-to-device connection with the relay user equipment is initiated through the random access process. The random access configuration information can be included in the response message.

After sending the response message, the relay user equipment waits to detect a connection request from the source user equipment, such as a connection request borne by the paging response, or a random access request initiated by the source user equipment, or a random access preamble sent by the source user equipment, or a connection request sent through a random access process. By receiving the paging response or through the random access process, a device-to-device connection is established between the source user equipment and the relay user equipment. The connotation of the device-to-device connection is the same as previous statements.

Therefore, the source user equipment can rely on a device-to-device connection established between the source user equipment and the relay user equipment and a cellular connection between the relay user equipment and the network device to achieve the communication with the network side.

Embodiment 2

Figure 6:
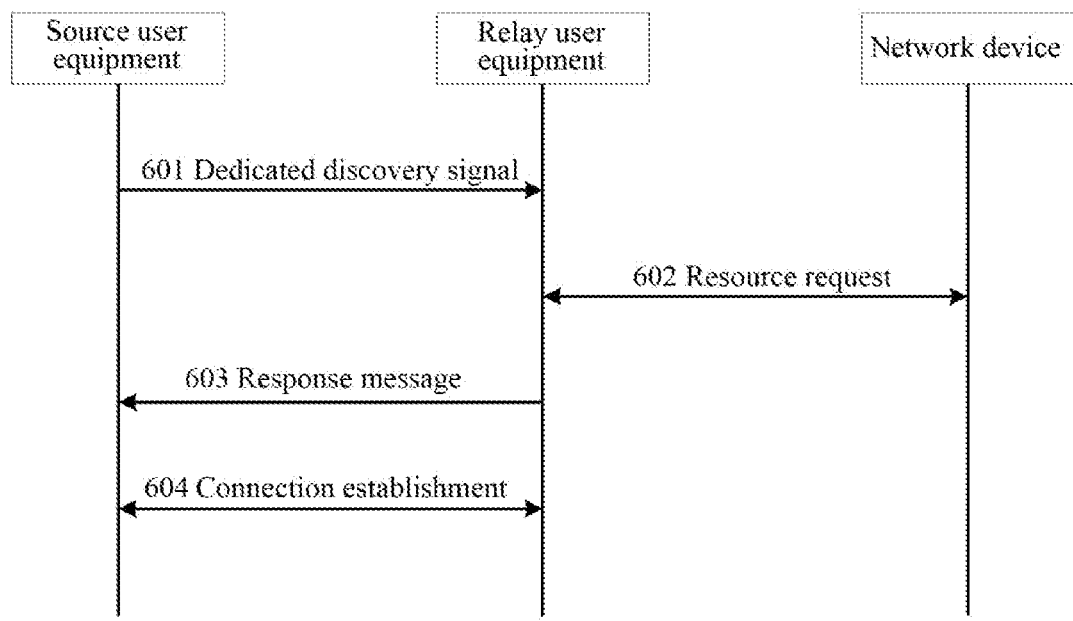

FIG. 6 shows a schematic diagram of another embodiment of the present document. The following steps are included in the embodiment.

In step 601, when a user equipment judges that a dedicated cellular communication condition is satisfied, a dedicated discovery signal is sent, and a relay user equipment detects the dedicated discovery signal.

When a relay function of the relay user equipment is activated or enabled, the dedicated discovery signal is detected in dedicated resources; and the dedicated discovery signal is used for indicating the existence of a source user equipment or a dedicated cellular communication requirement of the source user equipment, as mentioned before.

In step 602, after detecting the dedicated discovery signal sent by the source user equipment, the relay user equipment requests a network device for resources, and the requested resources are used for transmission of the related signals/signalings or data during the mutual discovery and/or communication with the source user equipment.

The process of requesting resources can simultaneously include a registration process and/or authentication process and/or attach process of the relay user equipment to the network; or, before requesting the resources, for example, before monitoring the dedicated discovery signal, the relay user equipment may have performed registration and/or authentication and/or attachment. Through operations such as resource request and/or registration and so on, the relay user equipment obtains an authorization for performing mutual discovery and/or establishing a device-to-device connection with other source user equipments from the network side.

It should be noted that, when monitoring the dedicated discovery signal, the relay user equipment can be in an RRC connected state or an RRC idle state. If it is in the idle state, the relay user equipment will firstly establish an RRC connection with the network side when requesting the network device for resources.

In step 603, after obtaining the authorization of the network, the relay user equipment sends a response message to the source user equipment according to the detected dedicated discovery signal, and the source user equipment detects the response message.

In step 604, after detecting the response message, the source user equipment establishes a device-to-device connection with the relay user equipment, and relies on the device-to-device connection and a cellular connection between the relay user equipment and the network device to communicate with the network side.

In the example, the process of sending and receiving the response message and the process of establishing the connection can be the same as previous statements, which will not be repeated.

Embodiment 3

Figure 7:
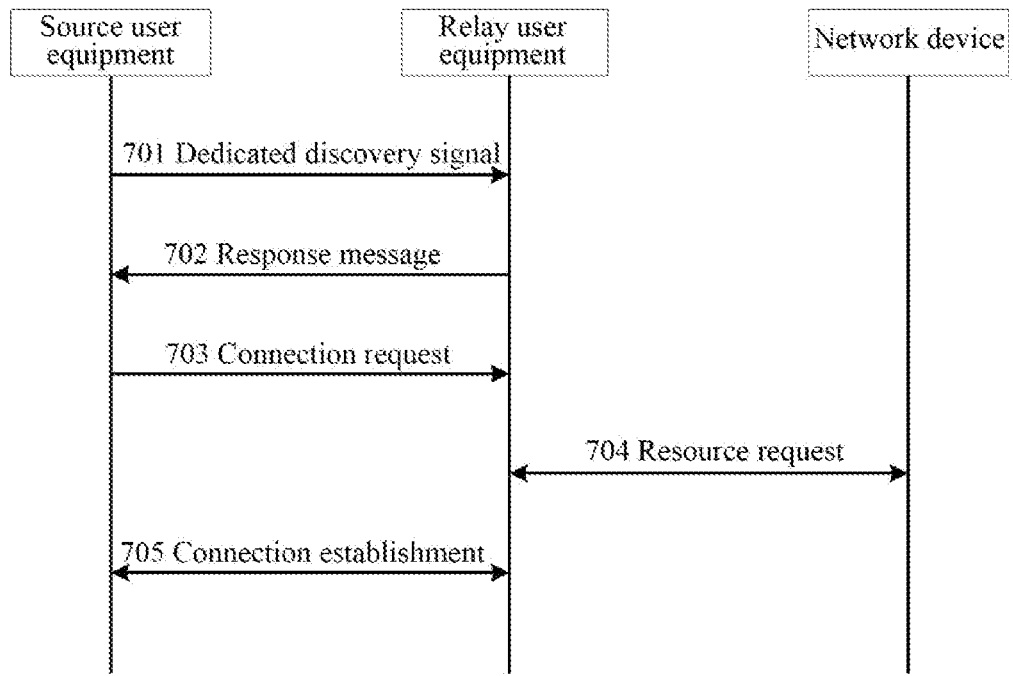

FIG. 7 shows a schematic diagram of a wireless communication method according to the embodiment 3 the present document, and the embodiment includes the following steps.

In step 701, when a user equipment judges that a dedicated cellular communication condition is satisfied, a dedicated discovery signal is sent, and a relay user equipment detects the dedicated discovery signal.

When a relay function of the relay user equipment is activated or enabled, the dedicated discovery signal is detected in dedicated resources. The dedicated discovery signal is used for indicating the existence of a source user equipment or a dedicated cellular communication requirement of the source user equipment, as mentioned before.

In step 702, after detecting the dedicated discovery signal sent by the source user equipment, the relay user equipment sends a response message, and the source user equipment detects the response message.

After sending the dedicated discovery signal, the source user equipment waits to detect the response message from the relay user equipment. The response message can use the foregoing sending method and structure. Or, the response message can only include a synchronization signal. The synchronization signal can be sent with the foregoing method; or, the synchronization signal is sent in appointed time and/or frequency locations. For example, in time, the synchronization signal and a synchronization signal of the cellular network can have the same time locations; or part of locations of the synchronization signal and the synchronization signal of the cellular network are identical, for example, the synchronization signal is only sent in radio frames with even or uneven numbers of the cellular network, and it has time identical with that of the synchronization signal in the radio frames; or there is a fixed time offset between the synchronization signal and the synchronization signal of the cellular network, and the offset can be in a unit of subframes, or slots, or OFDM or SC-FDM symbols. In frequency, locations of the synchronization signal sent by the relay user equipment and the synchronization signal of the cellular network can be different, but it is also determined in an appointed way, such as an uplink frequency band in an FDD system, or an uplink subframe in a TDD system; or the locations of the synchronization signal sent by the relay user equipment and the synchronization signal of the cellular network also can be identical.

In step 703, after detecting the response message, the source user equipment sends a connection request to the relay user equipment.

The connection request can include an identity of the source user equipment, so that the relay user equipment can differentiate different source user equipments. The transmission resources of the connection request can be reserved resources, such as resources appointed in the system and used for performing device discovery between the source user equipment and the relay user equipment; or resources allocated by the network, such as resources configured by the network through a broadcasting message and used for performing device discovery between the source user equipment and the relay user equipment. There can be an appointed time interval between the connection request and the response message.

In step 704, after sending the response message, the relay user equipment detects the connection request from the source user equipment, and if the connection request is detected, requests the network device for resources, the requested resources are used for transmission of the related information or data in establishing connection and/or communication with the source user equipment.

The process of requesting resources can simultaneously include a registration process and/or authentication process and/or attach process of the relay user equipment to the network; or, before requesting the resources, for example, before monitoring the dedicated discovery signal, the relay user equipment may have performed registration and/or authentication and/or attachment. Through operations such as resource request and/or registration and so on, the relay user equipment obtains an authorization for performing mutual discovery with other source user equipments from the network side.

It should be noted that, when monitoring the dedicated discovery signal, the relay user equipment can be in an RRC connected state or an RRC idle state. If it is in the idle state, the relay user equipment will firstly establish an RRC connection with the network side when requesting the network device for resources.

In step 705, after obtaining the authorization of the network, the relay user equipment interacts with the source user equipment, and establishes a device-to-device connection.

The source user equipment relies on the device-to-device connection and a cellular connection between the relay user equipment and the network device to communicate with the network side.

The process of establishing the connection can be the same as previous statements, which will not be repeated.

In the above method embodiments 1-3, the source user equipment, relay user equipment and network device are all involved, and the methods of the embodiments of the present document will be described from the angles of the source user equipment (hereinafter called as the first user equipment), the relay user equipment (hereinafter called as the second user equipment) and the network device respectively below.

Embodiment 4

Figure 8:
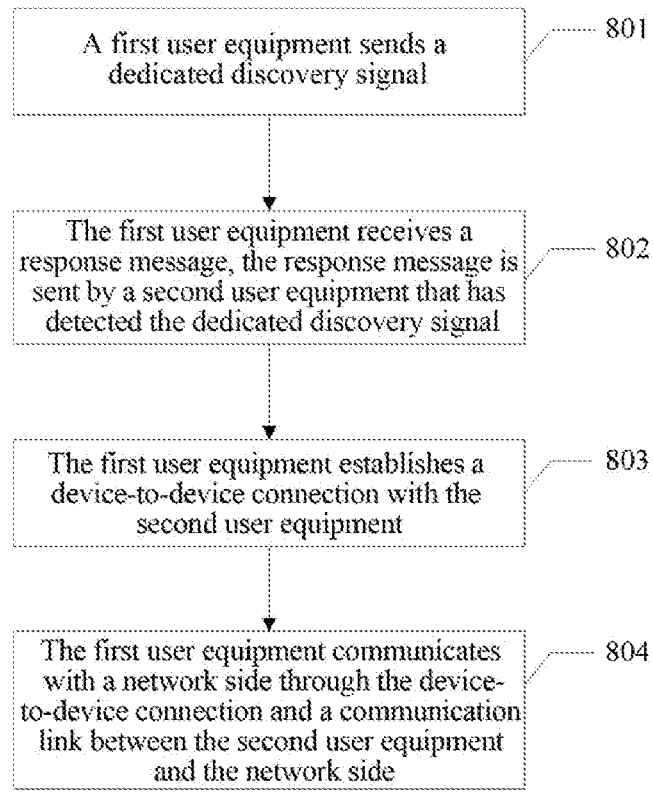

A wireless communication method according to the embodiment 4 of the present document will be described from the angle of the source user equipment namely the first user equipment, and as shown in FIG. 8, the method includes the following steps.

In step 801, the first user equipment sends a dedicated discovery signal.

The dedicated discovery signal is a reference signal or a synchronization signal or a preamble; or, the dedicated discovery signal is a signal occupying one or more than one resource element, and it has a specific sending time and/or frequency location; or, the dedicated discovery signal is a data block carrying the reference signal or the synchronization signal or the preamble, and the data block has an appointed modulation and coding scheme.

The first user equipment sends the dedicated discovery signal in dedicated resources when judging that a dedicated cellular communication condition is satisfied;

the dedicated cellular communication condition refers to that a signal of a cellular network is not detected, or a detected signal of the cellular network is lower than a preset threshold value, or it is unable to establish a connection with the cellular network.

The response message includes one or more than one of the following:

a synchronization signal, used for the first user equipment synchronizing with the second user equipment; synchronization information, used for the first user equipment obtaining synchronization information of the cellular network;

resource allocation information, used for allocating resources for the device-to-device connection;

information used for estimating whether the first user equipment is allowed to access; and common resource configuration information.

In step 802, the first user equipment receives a response message, wherein the response message is sent by a second user equipment detecting the dedicated discovery signal.

In step 803, the first user equipment establishes a device-to-device connection with the second user equipment.

Alternatively, the response message includes device discovery reply information used for indicating that the dedicated discovery signal is detected or the first user equipment is discovered or paging information of the first user equipment used for paging and sending the dedicated discovery signal; and the first user equipment sends a connection establishment request to the second user equipment according to the received device discovery reply information or paging information, the connection establishment request is used for requesting establishing the device-to-device connection with the second user equipment.

Alternatively, the response message includes a random access configuration parameter;

the first user equipment sends a connection establishment request to the second user equipment by means of random access according to the random access configuration parameter, and the connection establishment request is used for requesting establishing the device-to-device connection.

Based on the above descriptions, it is comprehensible that the above scheme includes the scheme of the first user equipment sending the connection establishment request by means of random access based on the paging of the second user equipment and then establishing the device-to-device connection.

The random access configuration parameter is identical with a random access configuration parameter of the cellular network; or, random access resources configured by the random access configuration parameter are a part of random access resources of a cellular system; or, the random access resources configured by the random access configuration parameter are different from the random access resources of the cellular system; and the random access resources include at least one of the following: time domain resources, frequency domain resources, and code resources.

The paging information includes one or more than one of the following:

a resource index of the dedicated discovery signal, a sequence index, or a user equipment identity carried in the dedicated discovery signal.

In step 804, the first user equipment communicates with a network side through the device-to-device connection and a communication link between the second user equipment and the network side.

Embodiment 5

Figure 9:
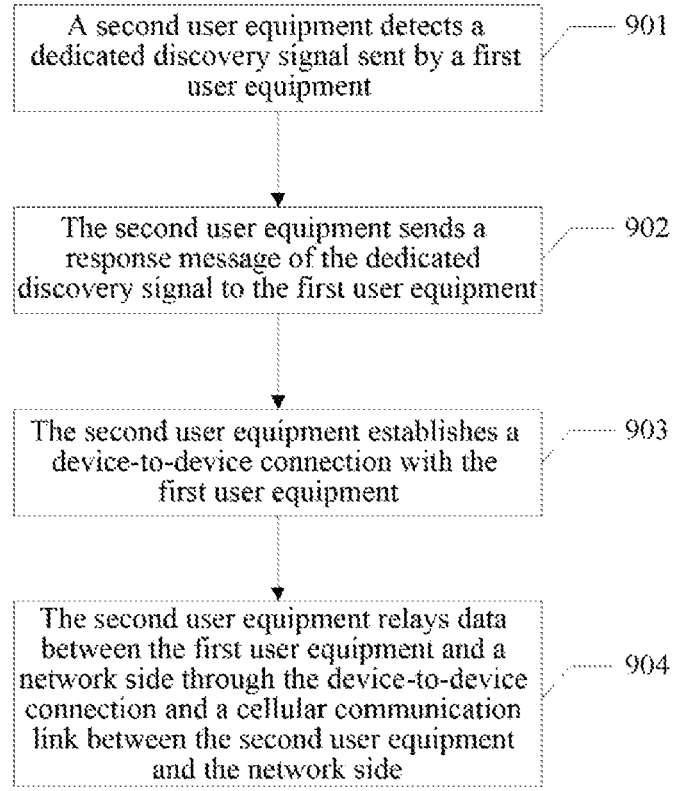

A wireless communication method according to the embodiment 5 of the present document will be described from the angle of the relay user equipment namely the second user equipment, and as shown in FIG. 9, the method includes the following steps.

In step 901, the second user equipment detects a dedicated discovery signal sent by the first user equipment.

The dedicated discovery signal is sent by the first user equipment in dedicated resources when a dedicated cellular communication condition is satisfied; the dedicated cellular communication condition refers to that, when the user equipment has a requirement for cellular communication or establishing a connection with the network side, the user equipment does not detect a signal of a cellular network, or it is unable to establish a connection with the cellular network.

The dedicated discovery signal is a reference signal or a synchronization signal or a preamble; or, the dedicated discovery signal is a signal occupying one or more than one resource element, and it has a specific sending time and/or frequency location; or, the dedicated discovery signal is a data block carrying the reference signal or the synchronization signal or the preamble, and the data block has an appointed modulation and coding scheme.

In step 902, the second user equipment sends a response message of the dedicated discovery signal to the first user equipment.

The response message includes one or more than one of the following:

a synchronization signal, used for the first user equipment synchronizing with the second user equipment;

synchronization information, used for the first user equipment obtaining synchronization information of the cellular network;

resource allocation information, used for allocating resources for the device-to-device connection;

information used for estimating whether the first user equipment is allowed to access; and common resource configuration information.

In step 903, the second user equipment establishes a device-to-device connection with the first user equipment.

Alternatively, the response message includes device discovery reply information used for indicating that the dedicated discovery signal is detected or the first user equipment is discovered or paging information of the first user equipment used for paging and sending the dedicated discovery signal; and the second user equipment establishes the device-to-device connection by receiving a connection request sent by the first user equipment based on the device discovery reply information or the paging information.

Alternatively, or furthermore, the response message includes a random access configuration parameter;

the second user equipment detects a connection establishment request sent by the first user equipment through a random access process, and the connection establishment request is used for requesting establishing the device-to-device connection.

The random access configuration parameter is identical with a random access configuration parameter of the cellular network; or, random access resources configured by the random access configuration parameter are a part of random access resources of a cellular system; or, the random access resources configured by the random access configuration parameter are different from the random access resources of the cellular system; and the random access resources include at least one of the following: time domain resources, frequency domain resources, and code resources.

The paging information includes one or more than one of the following:

a resource index of the dedicated discovery signal, a sequence index, or a user equipment identity carried in the dedicated discovery signal.

In step 904, the second user equipment relays communication data between the first user equipment and a network side through the device-to-device connection and a cellular communication link between the second user equipment and the network side.

Alternatively, before the device-to-device connection is established, for example, after the step 901 or step 902, or after receiving the connection request sent by the first user equipment, the method also includes:

the second user equipment sending an authorization request used for establishing the device-to-device connection to the network side and receiving an authorization response.

Embodiment 6

Figure 10:
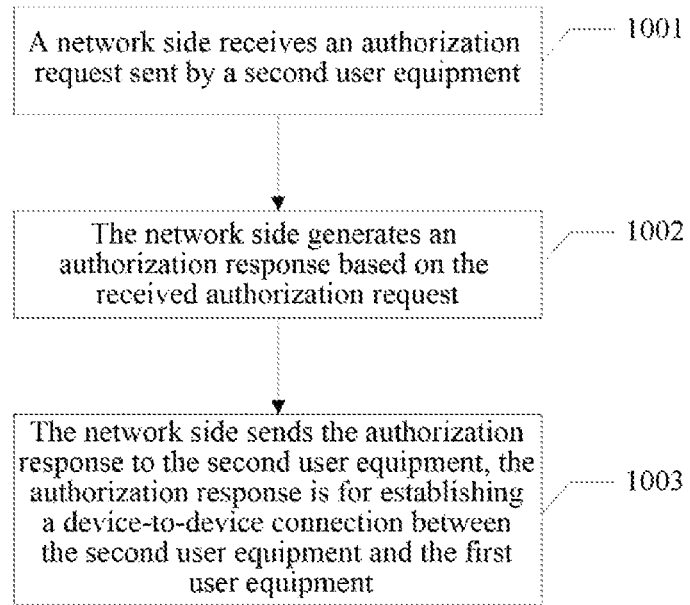

A wireless communication method according to the embodiment 6 of the present document will be described from the angle of the network device, and as shown in FIG. 10, the method includes the following steps.

In step 1001, the network side receives an authorization request sent by the second user equipment.

In step 1002, the network side generates an authorization response based on the received authorization request.

In step 1003, the network side sends the authorization response to the second user equipment, wherein the authorization response is used for authorizing the second user equipment to establish a device-to-device connection with the first user equipment, and the network side communicates with the first user equipment through a cellular communication link between the second user equipment and the network side and the device-to-device connection.

Alternatively, the authorization request includes authorization request information used for requesting resources, the requested resources are used when establishing the device-to-device connection and/or performing device-to-device communication.

Alternatively, the authorization request includes authorization request information used for requesting establishing the device-to-device connection by means of random access or by means of paging, when the second user equipment requests the means of random access, the first user equipment initiates random access to the second user equipment, and establishes the device-to-device connection through the random access process; when the second user equipment requests the means of paging, the second user equipment pages the first user equipment, and establishes the device-to-device connection through the paging process.

The authorization response includes a random access authorization, the first user equipment sends a connection establishment request to the second user equipment through the random access process, the connection establishment request is used for requesting establishing the device-to-device connection; or, the authorization response includes a paging authorization, the second user equipment establishes the device-to-device connection by paging the first user equipment.

Figure 11:
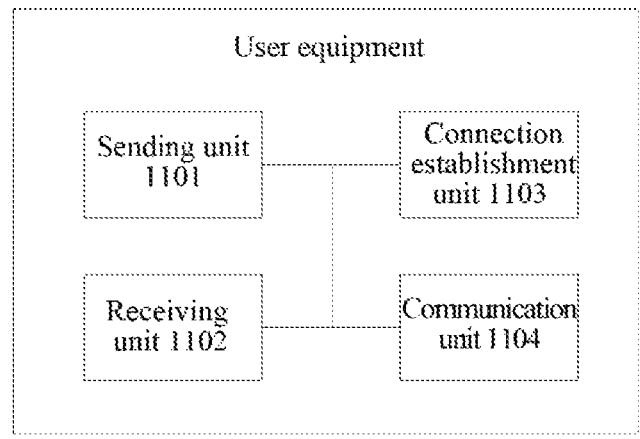
FIG. 11 to FIG. 12 are schematic diagrams of modular structures of the user equipments according to the embodiments of the present document.

The embodiment of the present document also provides a user equipment, the functions of the user equipment can implement the functions of the source user equipment namely the first user equipment mentioned above, and as shown in FIG. 11, the user equipment includes:

a sending unit 1101 (also can be called as a transmitter), used to send a device-to-device signal to other user equipments, and send an uplink signal to a network device such as a base station, including sending a dedicated discovery signal (including generating the discovery signal).

When the user equipment is the foregoing source user equipment, the transmitter also can be used for sending a dedicated discovery signal in a device-to-device link, or sending a signal carrying a connection request, or sending other device-to-device signals to the relay user equipment in the process of establishing the device-to-device connection; and when there is a direct communication link between the source user equipment and the cellular network such as the base station, it also can send an uplink signal of the cellular link to the base station.

The dedicated discovery signal is a reference signal or a synchronization signal or a preamble; or, the dedicated discovery signal is a signal occupying one or more than one resource element, and it has a specific sending time and/or frequency location; or, the dedicated discovery signal is a data block carrying the reference signal or the synchronization signal or the preamble, and the data block has an appointed modulation and coding scheme.

The sending unit sends the dedicated discovery signal in dedicated resources when a dedicated cellular communication condition is satisfied, the dedicated cellular communication condition refers to that a signal of the cellular network is not detected, or a detected signal of the cellular network is lower than a preset threshold value, or it is unable to establish a connection with the cellular network.

A receiving unit 1102 (also can be called as a receiver) is used to receive a device-to-device signal transmitted by other user equipments, and receive a downlink signal transmitted by the network device such as the base station, including receiving a response message of the dedicated discovery signal (including detecting or parsing the response message), the response message is sent by the second user equipment detecting the dedicated discovery signal.

When the user equipment is the foregoing source user equipment, the receiver also can be used for receiving a signal carrying the response message from the relay user equipment, or other signals in the connection establishment process, such as a signal carrying a paging message and so on; and when there is a direct communication link between the source user equipment and the cellular network such as the base station, it also can receive a downlink signal of the cellular link from the base station.

The response message includes one or more than one of the following:

a synchronization signal, used for the first user equipment synchronizing with the second user equipment;

synchronization information, used for the first user equipment obtaining synchronization information of the cellular network;

resource allocation information, used for allocating resources for the device-to-device connection;

information used for estimating whether the first user equipment is allowed to access; and common resource configuration information.

A connection establishment unit 1103 is used to: after receiving the response message, establish a device-to-device connection with the second user equipment, including initiating the process of establishing the device-to-device connection with the second user equipment (i.e. the relay user equipment), and executing the establishment of the device-to-device connection with the relay user equipment.

Alternatively, the response message includes device discovery reply information used for indicating that the dedicated discovery signal is detected or the first user equipment is discovered or paging information of the first user equipment used for paging and sending the dedicated discovery signal; and the connection establishment unit generates and sends a connection establishment request according to the device discovery reply information or the paging information, the connection establishment request is used for requesting establishing the device-to-device connection with the second user equipment.

Alternatively, the response message includes a random access configuration parameter;

the connection establishment unit sends a connection establishment request to the second user equipment by means of random access according to the random access configuration parameter, the connection establishment request is used for requesting establishing the device-to-device connection.

The random access configuration parameter is identical with a random access configuration parameter of the cellular network; or, random access resources configured by the random access configuration parameter are a part of random access resources of a cellular system; or, the random access resources configured by the random access configuration parameter are different from the random access resources of the cellular system; and the random access resources include at least one of the following: time domain resources, frequency domain resources, and code resources.

The paging information includes one or more than one of the following:

a resource index of the dedicated discovery signal, a sequence index, or a user equipment identity carried in the dedicated discovery signal.

A communication unit 1104 is used to communicate with a network side through the device-to-device connection and a cellular communication link between the second user equipment and the network side.

Figure 12:
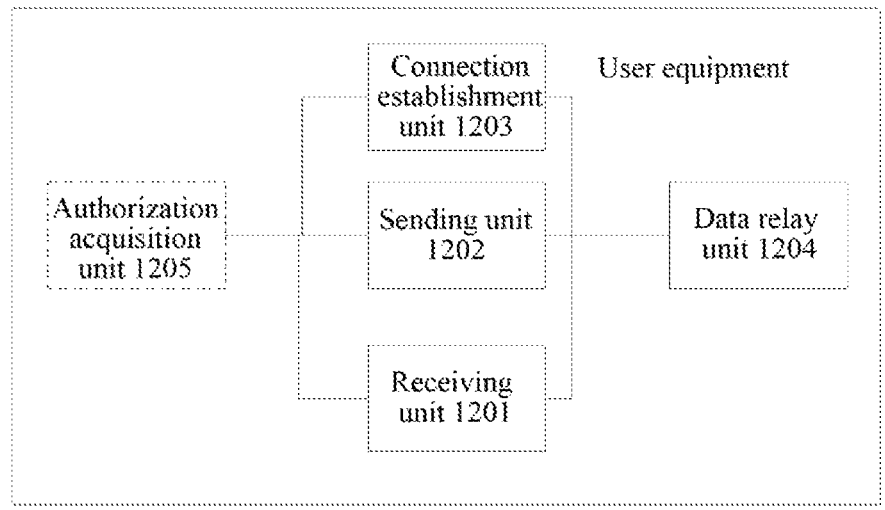

The embodiment of the present document also provides a user equipment, the functions implemented by the user equipment can implement the functions of the relay user equipment or the second user equipment above, and as shown in FIG. 12, the user equipment includes:

a receiving unit 1201 (also can be called as a receiver), used to detect a dedicated discovery signal sent by the first user equipment;

as the forgoing relay user equipment, the receiver can be used for receiving a signal a dedicated discovery signal of a device-to-device link, or receiving a signal carrying a connection request, or other device-to-device signals in the process of establishing the device-to-device connection; and when requesting the network for resources, the receiver also can receive a connection authorization or a resource authorization from the network device such as the base station, etc.

The dedicated discovery signal is sent by the first user equipment in dedicated resources when a dedicated cellular communication condition is satisfied; the dedicated cellular communication condition refers to that, when the user equipment has a requirement for cellular communication or establishing a connection with the network side, the user equipment does not detect a signal of the cellular network, or it is unable to establish a connection with the cellular network.

The dedicated discovery signal is a reference signal or a synchronization signal or a preamble; or, the dedicated discovery signal is a signal occupying one or more than one resource element, and it has a specific sending time and/or frequency location; or, the dedicated discovery signal is a data block carrying the reference signal or the synchronization signal or the preamble, and the data block has an appointed modulation and coding scheme.

The response message includes one or more than one of the following:

a synchronization signal, used for the first user equipment synchronizing with the second user equipment;

synchronization information, used for the first user equipment obtaining synchronization information of the cellular network;

resource allocation information, used for allocating resources for the device-to-device connection;

information used for estimating whether the first user equipment is allowed to access; and common resource configuration information.

A sending unit 1202 (also can be called as a transmitter) is used to send a response message of the dedicated discovery signal to the first user equipment (including generating the response message);

as the forgoing relay user equipment, the transmitter can be used for sending a signal carrying the response message to the source user equipment, or other signals in the connection establishment process, such as a signal carrying a paging message and so on; and when requesting the network for resources, the transmitter can send a signal carrying a connection request or a resource request to the network device such as the base station, etc.

A connection establishment unit 1203 is used to establish a device-to-device connection with the first user equipment, including executing operations in the process of establishing the connection with the source user equipment.

Alternatively, the response message includes device discovery reply information used for indicating that the dedicated discovery signal is detected or the first user equipment is discovered or paging information of the first user equipment used for paging and sending the dedicated discovery signal; and the connection establishment unit establishes the device-to-device connection by receiving a connection request sent by the first user equipment based on the device discovery reply information or the paging information.

Alternatively, or furthermore, the response message includes a random access configuration parameter;

the connection establishment unit detects a connection establishment request sent by the first user equipment through a random access process, the connection establishment request is used for requesting establishing the device-to-device connection.

The random access configuration parameter is identical with a random access configuration parameter of the cellular network; or, random access resources configured by the random access configuration parameter are a part of random access resources of a cellular system; or, the random access resources configured by the random access configuration parameter are different from the random access resources of the cellular system; and the random access resources include at least one of the following: time domain resources, frequency domain resources, and code resources.

The paging information includes one or more than one of the following:

a resource index of the dedicated discovery signal, a sequence index, or a user equipment identity carried in the dedicated discovery signal.

A data relay unit 1204 is used to relay communication data between the first user equipment and the network side through the device-to-device connection and a cellular communication link between the second user equipment and the network side.

Alternatively, the user equipment also includes an authorization acquisition unit 1205, used to: before the device-to-device connection is established, send an authorization request used for establishing the device-to-device connection to the network side and receive an authorization response.

In practical implementation, it does not exclude that the same user equipment simultaneously implements the functions of the source user equipment (the first user equipment) and the relay user equipment (the second user equipment) above, and other functions of the existing user equipments.

Figure 13:
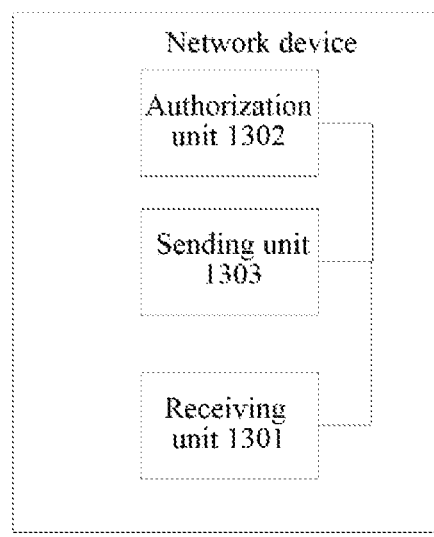
FIG. 13 is a schematic diagram of a modular structure of a network device according to the embodiment of the present document.

The embodiment of the present document also provides a network device, and as shown in FIG. 13, the network device includes:

a receiving unit 1301 (also can be called as a receiver), used to receive an uplink signal sent by the user equipment, including receiving an authorization request sent by the second user equipment;

an authorization unit 1302, used to generate an authorization response based on the received authorization request; and a sending unit 1303 (also can be called as a transmitter), used to send a downlink signal to the user equipment, including sending the authorization response to the second user equipment, wherein the authorization response is used for authorizing the second user equipment to establish a device-to-device connection with the first user equipment, and the network device communicates with the first user equipment through a cellular communication link between the second user equipment and the network device and the device-to-device connection.

As mentioned above, alternatively, the authorization request includes authorization request information used for requesting resources, the requested resources are used when establishing the device-to-device connection and/or performing device-to-device communication.

Alternatively, the authorization response includes a random access authorization, the first user equipment sends a connection establishment request to the second user equipment through a random access process, the connection establishment request is used for requesting establishing the device-to-device connection; or, the authorization response includes a paging authorization, the second user equipment establishes the device-to-device connection by paging the first user equipment.

In addition, the embodiment of the present document also provides a wireless communication system, the system includes the first user equipment (the source user equipment), the second user equipment (the relay user equipment) and the network device as mentioned above, and the respective specific functional module structures thereof are the same as the above descriptions, which will not be repeated here.

Compared with the related art, in the wireless communication method, user equipment, network device, and system of the embodiments of the present document, the second user equipment establishing the connection with the network side is taken as the relay of the first user equipment, which solves the wireless communication problem when the first user equipment is located in a worse network coverage or in a network coverage blind area, thereby significantly improving the user experience of the wireless communication, and not leading to the cost increase of the network deployment of the telecom operators.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, or they can be made into multiple integrated circuit modules respectively, or multiple modules or steps of them can be made into a single integrated circuit module to be implemented. Therefore, the present document is not limited to any combination of hardware and software in a specific form.

The above description is only the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

Compared with the related art, in the wireless communication method, user equipment, network device, and system of the embodiments of the present document, the second user equipment establishing the connection with the network side is taken as the relay of the first user equipment, which solves the wireless communication problem when the first user equipment is located in a worse network coverage or in a network coverage blind area, thereby significantly improving the user experience of the wireless communication, and not leading to the cost increase of the network deployment of the telecom operators.

What is claimed is:

1. A wireless communication method, comprising:
   a first user equipment sending a dedicated discovery signal;
   the first user equipment receiving a response message, wherein the response message is sent by a second user equipment that has detected the dedicated discovery signal;
   the first user equipment establishing a device-to-device connection with the second user equipment; and
   the first user equipment communicating with a network side through the device-to-device connection and a communication link between the second user equipment and the network side;
   wherein the dedicated discovery signal is a signal occupying one or more than one resource element, and has a specific sending time and/or frequency location, wherein the dedicated discovery signal is a data block carrying a synchronization signal or a preamble, and the data block has an appointed modulation and coding scheme.

2. The method according to claim 1, wherein: the first user equipment sends the dedicated discovery signal in dedicated resources when judging that a dedicated cellular communication condition is satisfied:
   the dedicated cellular communication condition refers to that no signal of a cellular network is detected, or a received signal power of the cellular network is lower than a preset threshold value, or a connection with the cellular network is unable to be established.

3. The method according to claim 1, wherein: the response message at least comprises one or more than one of the following:
   a synchronization signal for synchronizing the first user equipment with the second user equipment;
   synchronization information for the first user equipment obtaining synchronization information of the cellular network;
   resource allocation information for allocating resources to the device-to-device connection;
   information for estimating whether the first user equipment is allowed to access; and
   common resource configuration information.

4. The method according to claim 1, wherein: the response message comprises device discovery reply information for indicating that the dedicated discovery signal is detected or the first user equipment is discovered or paging information for paging the first user equipment sending the dedicated discovery signal.

5. The method according to claim 4, wherein: the paging information comprises one or more than one of the following:
   a resource index, a sequence index of the dedicated discovery signal, or a user equipment identity carried in the dedicated discovery signal; and
   paging a user equipment sending the dedicated discovery signal through one or more than one kind of information in the resource index, the sequence index, and the user equipment identity.

6. The method according to claim 1, wherein: the response message comprises a random access configuration parameter;
   the first user equipment sends a connection establishment request to the second user equipment by means of random access according to the random access configuration parameter, and the connection establishment request is used for requesting establishing the device-to-device connection.

7. The method according to claim 6, wherein:
   the random access configuration parameter is identical with a random access configuration parameter of the cellular network; or
   random access resources configured by the random access configuration parameter are a part of random access resources of a cellular system; or
   the random access resources configured by the random access configuration parameter are different from the random access resources of the cellular system; and
   the random access resources comprise at least one of the following: time domain resources, frequency domain resources, and code resources.

8. The method according to claim 1 wherein the dedicated discovery signal comprises a reference signal.

9. A user equipment, comprising a calculating device, and a storage device for storing program code that when executed by the calculating device causes the calculating device to enable:
   a sending unit configured to send a dedicated discovery signal;
   a receiving unit configured to receive a response message, wherein the response message is sent by a second user equipment that has detected the dedicated discovery signal;
   a connection establishment unit configured to establish a device-to-device connection with the second user equipment after receiving the response message; and
   a communication unit configured to communicate with a network side through the device-to-device connection and a cellular communication link between the second user equipment and the network side;
   wherein the dedicated discovery signal is a signal occupying one or more than one resource element, and has specific sending time and/or frequency location, and wherein the dedicated discovery signal is a data block carrying a synchronization signal or preamble, and the data block has an appointed modulation and coding scheme.

10. The user equipment according to claim 9, wherein: the sending unit sends the dedicated discovery signal in dedicated resources when judging that a dedicated cellular communication condition is satisfied, the dedicated cellular communication condition refers to that no signal of a cellular network is detected, or a detected signal of the cellular network is lower than a preset threshold value, or a connection with the cellular network is unable to be established.

11. The user equipment according to claim 9, wherein:
the response message comprises device discovery reply information for indicating that the dedicated discovery signal is detected or the first user equipment is discovered or paging information for paging the first user equipment sending the dedicated discovery signal.

12. The user equipment according to claim 9, wherein:
the response message comprises a random access configuration parameter;
the connection establishment unit sends a connection establishment request to the second user equipment by means of random access according to the random access configuration parameter, and the connection establishment request is used for requesting establishing the device-to-device connection.

13. The user equipment according to claim 9 wherein the dedicated discovery signal comprises a reference signal.

14. A wireless communication method, comprising:
a second user equipment detecting a dedicated discovery signal sent by a first user equipment;
the second user equipment sending a response message of the dedicated discovery signal to the first user equipment;
the second user equipment establishing a device-to-device connection with the first user equipment; and
the second user equipment relaying communication data from the first user equipment to a network side through the device-to-device connection and a cellular communication link between the second user equipment and the network side;
wherein the dedicated discovery signal is a signal occupying one or more than one resource element, and has a specific sending time and/or frequency location, wherein the dedicated discovery signal is a data block carrying a synchronization signal or a preamble, and the data block has an appointed modulation and coding scheme.

15. The method according to claim 14, wherein before the device-to-device connection is established, further comprising:
the second user equipment sending an authorization request for establishing the device-to-device connection to the network side and receiving an authorization response from the network side.

16. The method according to claim 14, wherein: the dedicated discovery signal is sent by the first user equipment in dedicated resources when a dedicated cellular communication condition is satisfied; the dedicated cellular communication condition refers to that, when the user equipment has a requirement for cellular communication or establishing a connection with the network side, the user equipment does not detect a signal of a cellular network, or a detected signal of the cellular network is lower than a preset threshold value, or a connection with the cellular network is unable to be established.

17. The method according to claim 14, wherein,
the response message comprises device discovery reply information for indicating that the dedicated discovery signal is detected or the first user equipment is discovered or paging information for paging the first user equipment sending the dedicated discovery signal; and
the second user equipment establishes the device-to-device connection by receiving a connection request sent by the first user equipment based on the device discovery reply information or the paging information.

18. The method according to claim 17, wherein: the paging information comprises one or more than one of the following:
a resource index, a sequence index of the dedicated discovery signal, or a user equipment identity carried in the dedicated discovery signal; and
the second user equipment paging a user equipment sending the dedicated discovery signal through one or more than one kind of information in the resource index, the sequence index, and the user equipment identity.

19. The method according to claim 14 wherein the dedicated discovery signal comprises a reference signal.

20. The method according to claim 14, wherein,
the response message comprises a random access configuration parameter; and
the second user equipment detects a connection establishment request sent by the first user equipment through a random access procedure, and the connection establishment request is used for requesting establishing the device-to-device connection.

* * * * *